US010896131B2

(12) United States Patent
Bazarsky et al.

(10) Patent No.: US 10,896,131 B2
(45) Date of Patent: Jan. 19, 2021

(54) SYSTEM AND METHOD FOR CONFIGURING A STORAGE DEVICE BASED ON PREDICTION OF HOST SOURCE

(71) Applicant: Western Digital Technologies, Inc., San Jose, CA (US)

(72) Inventors: Alex Bazarsky, Holon (IL); Ariel Navon, Revava (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 24 days.

(21) Appl. No.: 16/259,502

(22) Filed: Jan. 28, 2019

(65) Prior Publication Data

US 2020/0242038 A1    Jul. 30, 2020

(51) Int. Cl.
*G06F 12/08* (2016.01)
*G06F 12/0862* (2016.01)
*G06F 3/06* (2006.01)
*G06F 13/18* (2006.01)
*G06F 13/16* (2006.01)
*G06N 7/00* (2006.01)
*G06N 3/02* (2006.01)

(52) U.S. Cl.
CPC .......... *G06F 12/0862* (2013.01); *G06F 3/067* (2013.01); *G06F 3/0611* (2013.01); *G06F 3/0629* (2013.01); *G06F 3/0659* (2013.01); *G06F 13/1642* (2013.01); *G06F 13/18* (2013.01); *G06N 3/02* (2013.01); *G06N 7/005* (2013.01); *G06F 2212/6026* (2013.01)

(58) Field of Classification Search
CPC ...... G06F 3/0611; G06F 3/0659; G06F 3/067; G06F 3/0629; G06F 12/0862; G06F 2212/6026; G06F 13/1642; G06F 13/18; G06N 3/02; G06N 7/005
See application file for complete search history.

(56) References Cited

U.S. PATENT DOCUMENTS

| 5,146,578 | A | 9/1992 | Zangenehpour |
| 5,659,713 | A | 8/1997 | Goodwin et al. |
| 5,761,464 | A | 6/1998 | Hopkins |

(Continued)

OTHER PUBLICATIONS

Adi Fuchs et al., "Loop-Aware Memory Prefetching Using Code Block Working Sets", 2014, 47th Annual IEEE/ACM International Symposium on Microarchitecture, pp. 533-544.

(Continued)

*Primary Examiner* — Hiep T Nguyen
(74) *Attorney, Agent, or Firm* — Brinks Gilson & Lione

(57) ABSTRACT

Systems and methods for predicting the next host source of a command directed to a storage device, and configuring the storage device with the host memory configuration parameters of that predicted host, are disclosed. A predictive model may be used to identify which of a plurality of different actual or virtual hosts will be sending a next command based on a pattern of prior host origins of commands. The storage device may include a plurality of different memory configuration parameters associated with each different host source and may update the current memory configuration based on the predicted next host origin prior to actual receipt of a next command.

20 Claims, 13 Drawing Sheets

(56) References Cited

U.S. PATENT DOCUMENTS

| | | |
|---|---|---|
| 5,765,213 A | 6/1998 | Ofer |
| 5,802,566 A | 9/1998 | Hagersten |
| 6,092,149 A | 7/2000 | Hicken et al. |
| 6,721,870 B1 | 4/2004 | Yochai et al. |
| 6,976,147 B1 | 12/2005 | Isaac et al. |
| 7,386,675 B2 | 6/2008 | Fachan |
| 7,451,348 B2 | 11/2008 | Pecone et al. |
| 8,225,047 B2 | 7/2012 | Yano et al. |
| 8,539,163 B1 | 9/2013 | Sivasubramanian et al. |
| 8,732,406 B1 | 5/2014 | Pase et al. |
| 2003/0126406 A1* | 7/2003 | Hammarlund ........ G06F 9/3842 712/200 |
| 2003/0149837 A1 | 8/2003 | Coker et al. |
| 2006/0047914 A1 | 3/2006 | Hofmann et al. |
| 2007/0016721 A1 | 1/2007 | Gay |
| 2011/0126154 A1 | 5/2011 | Boehler et al. |
| 2011/0310257 A1* | 12/2011 | Armstrong ......... H04N 1/00212 348/207.1 |
| 2012/0030431 A1 | 2/2012 | Anderson et al. |
| 2013/0124794 A1 | 5/2013 | Bux et al. |
| 2013/0179460 A1 | 7/2013 | Acuna et al. |
| 2014/0082324 A1 | 3/2014 | Elhamias et al. |
| 2017/0075629 A1 | 3/2017 | Manohar et al. |
| 2020/0097203 A1* | 3/2020 | Mallick .................. H04L 49/25 |

OTHER PUBLICATIONS

U.S. Appl. No. 16/024,607, filed Jun. 29, 2018.
U.S. Appl. No. 16/024,617, filed Jun. 29, 2018.
U.S. Appl. No. 16/226,021, filed Dec. 19, 2018.

* cited by examiner

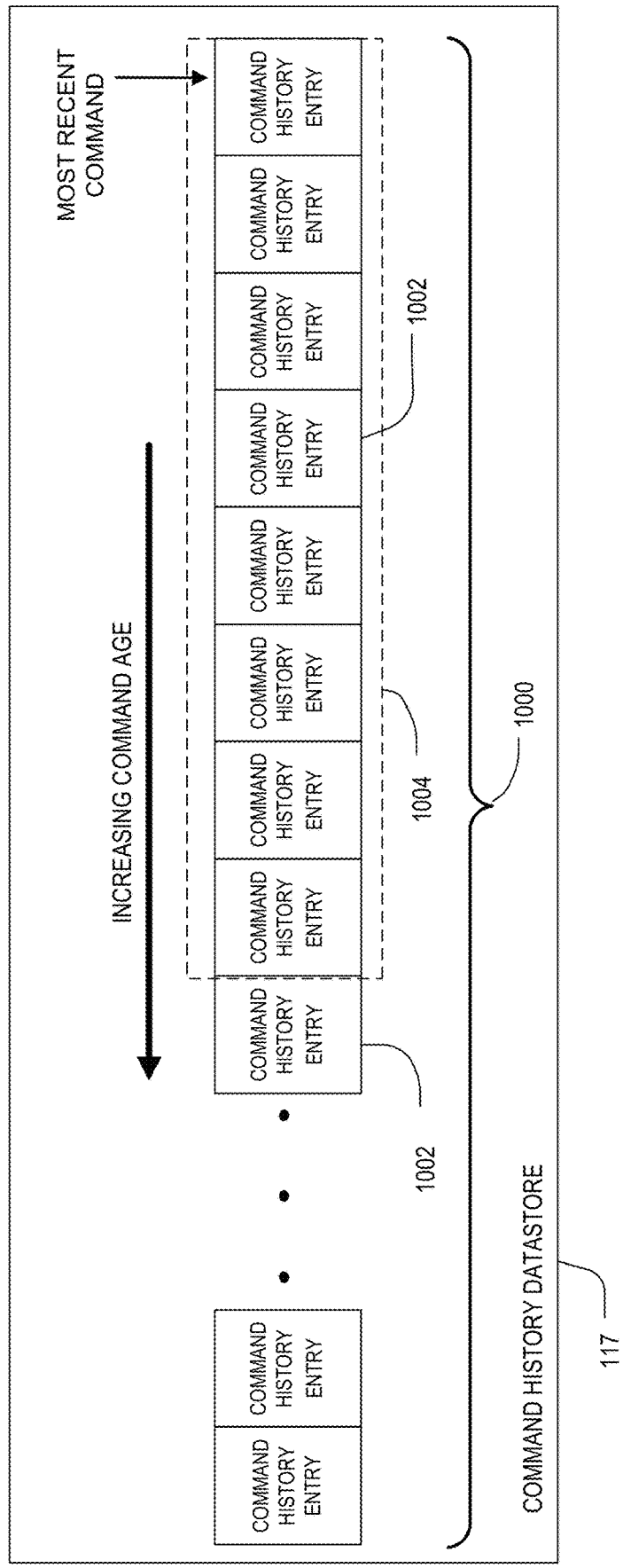

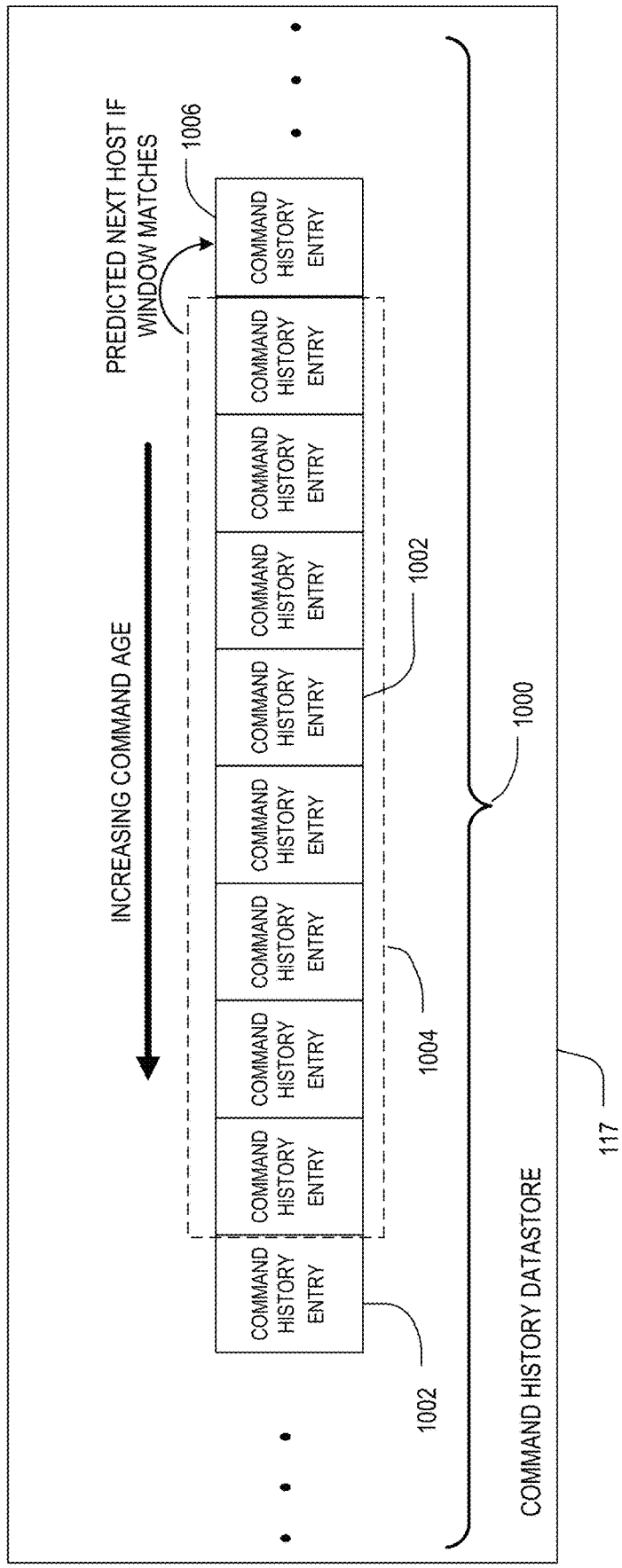

SYSTEM AND METHOD FOR CONFIGURING A STORAGE DEVICE BASED ON PREDICTION OF HOST SOURCE

BACKGROUND

Non-Volatile Memory Express (NVMe) is a standard for accessing non-volatile storage media attached via a Peripheral Component Interconnect Express (referred to herein as PCI express or PCIe) bus. NVMe may be used with a variety of non-volatile storage media, such as solid state drives (SSDs). One focus of NVMe relates to input/output (I/O) communication between a host device (which may access and/or write to the non-volatile storage media) and a storage device (which includes the non-volatile storage media). NVMe implements a paired submission queue and completion queue mechanism, with host software on the host device placing commands into the submission queue and are fetched by the storage device for execution. Completions of commands are placed onto the associated completion queue by the storage device controller. One version of the NVMe standard introduces the concept of a virtualization environment where a single physical host device can support multiple different hosts, including a physical host and multiple virtual hosts. The different hosts supported on such an NVMe-enabled single physical host device may each use the same storage device, but the storage device needs to adapt itself to the needs of each of the hosts.

BRIEF DESCRIPTION OF THE DRAWINGS

FIG. 10A is a block diagram of a version of predicting a next host using a command sequence search in a command history datastore in the methods of FIG. 6.

FIG. 10B is a block diagram of the command sequence search of FIG. 10A representing a pattern match and the location of the predicted next host based on the pattern match.

DETAILED DESCRIPTION

Figure 1A:
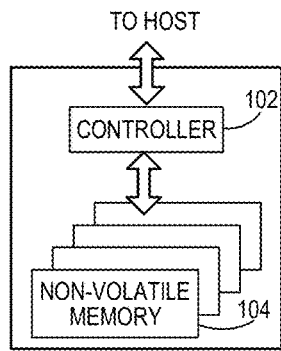
FIG. 1A is a block diagram of an example non-volatile memory system.

In order to improve performance of a storage device when receiving commands from different hosts, where each host has different requirements and configurations from the other hosts that may add latency due to the time needed to configure the storage device for each host, a system and method for configuring a storage device based on prediction of host source is disclosed below.

As noted above, the Non-Volatile Memory Express (NVM Express or NVMe) standard is based on a paired submission and completion queue mechanism. NVM Express is a scalable host controller interface designed to address the needs of Enterprise and Client systems that utilize PCI Express based solid state drives. It is based on a paired Submission and Completion Queue mechanism. Commands are placed by host software into a Submission Queue. Completions are placed into the associated Completion Queue by the controller. Submission and Completion Queues are allocated either in Host memory or device memory. A recent NVMe standard (version 1.3) introduces the NVMe virtualization environment. Virtualized environments may use an NVM subsystem with multiple controllers to provide virtual or physical hosts direct I/O access. The NVM subsystem is composed of primary controller(s) and secondary controller(s), where the secondary controller(s) depend on primary controller(s) for dynamically assigned resources. A host may issue an Identify command to a primary controller specifying the Secondary Controller List to discover the secondary controllers associated with that primary controller. An NVMe system can be referred as a multi-user system since it usually contains many submission queues that are associated with different Host processors. Although the systems and methods disclosed herein may apply to other virtualized systems aside from an NVMe virtualized environment, and may also apply to embodiments where a single storage device is in communication with multiple separate physical host devices, examples of the NVMe virtualized environment and parameter differences between the different hosts in such an environment are primarily discussed below for ease of illustration.

In a first aspect, a storage device is disclosed having a non-volatile memory, a volatile memory and a controller in communication with the non-volatile memory and the volatile memory. The controller is configured to receive a command from a first host of a plurality of hosts in communication with the storage device and, prior to receiving a next command, predict a next host of the plurality of hosts from which the next command will arrive at the storage device based on the received command. The controller is further configured to configure the storage device with host memory configuration parameters for the predicted next host prior to receiving the next command. The prediction of the next host from which a command will issue may be made using a table or other data structure of sequential host identifiers for past host commands and looking for a pattern from host identifiers for recent commands including the current command. Alternatively, the host prediction mechanism may be a neural network or state table maintained in the storage device for the multiple hosts. The configuration parameters may include the type and priority of host submission queues for each host, the arbitration method used to select among the submission queues for that host and/or other host defined parameters. The configuration parameters and the data structure or neural network components may be stored in volatile or non-volatile memory in the storage device.

According to another aspect, a method for configuring a storage device is disclosed. The method may include receiving commands from a plurality of hosts in communication with the storage device. For a most recently received command, the method may include identifying a host, out of the plurality of hosts, associated with the most recently received command. The method includes determining, prior to receiving a next command, a predicted next host of the plurality of hosts from which a next command will arrive at the storage device based on the most recently received command. The method further includes retrieving host memory configuration parameters for the predicted next host from a memory in the storage device and updating the storage device with the retrieved host memory configuration parameters. In different implementations of the method, the step identifying the host may be implemented by examining the host identifier that is sent with each command. Determining the next host from which a command will next arrive may be accomplished by comparing a pattern of recent host identifiers to a stored table or other data structure containing host identification information.

In yet other aspects, a storage device is disclosed having a non-volatile memory and a volatile memory containing a plurality of sets of host memory configuration parameters each associated with a respective one of a plurality of hosts in communication with the storage device. The storage device further includes means for, in response to receiving a command from a first host of the plurality of hosts, predicting a next host of the plurality of hosts from which a next command will arrive based on the received host command. The storage device also includes means for configuring the storage device with a set of host memory configuration parameters from the plurality of sets of host memory configuration parameters for the predicted next host prior to receiving the next command.

Referring now to FIG. 1A, a block diagram illustrating a non-volatile memory system is shown. The non-volatile memory (NVM) system 100, which may also be referred to herein as a storage device or a memory device, includes a controller 102 and non-volatile memory that includes one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cells (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
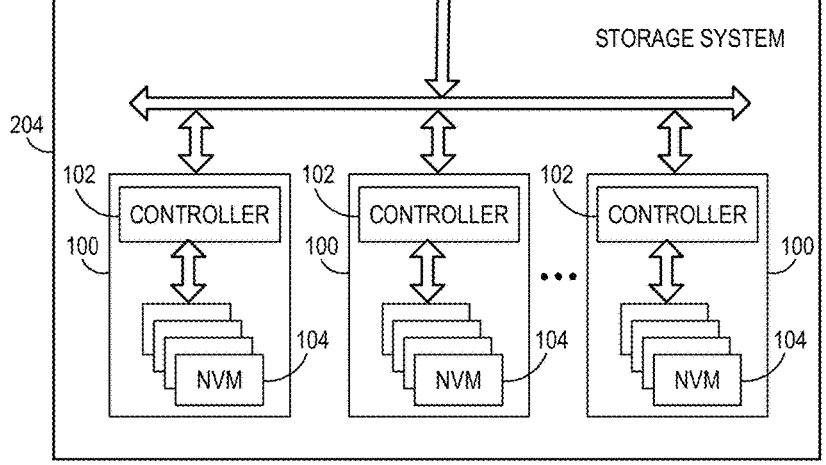
FIG. 1B is a block diagram illustrating an exemplary storage module.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interconnect express (PCIe) interface. Storage module 200, in one embodiment, may be a solid state drive (SSD), such as found in portable computing devices, such as laptop computers, and tablet computers.

Figure 1C:
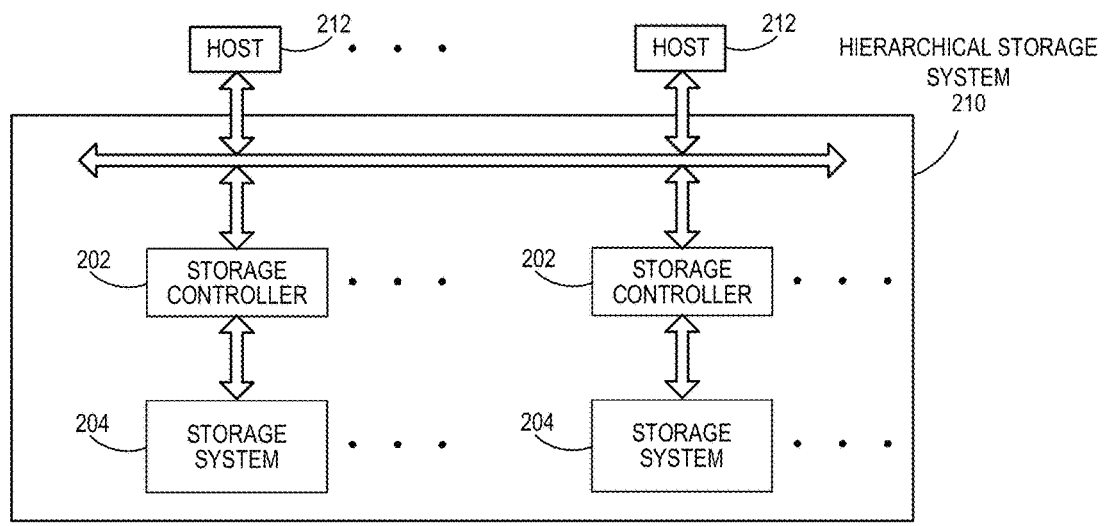
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
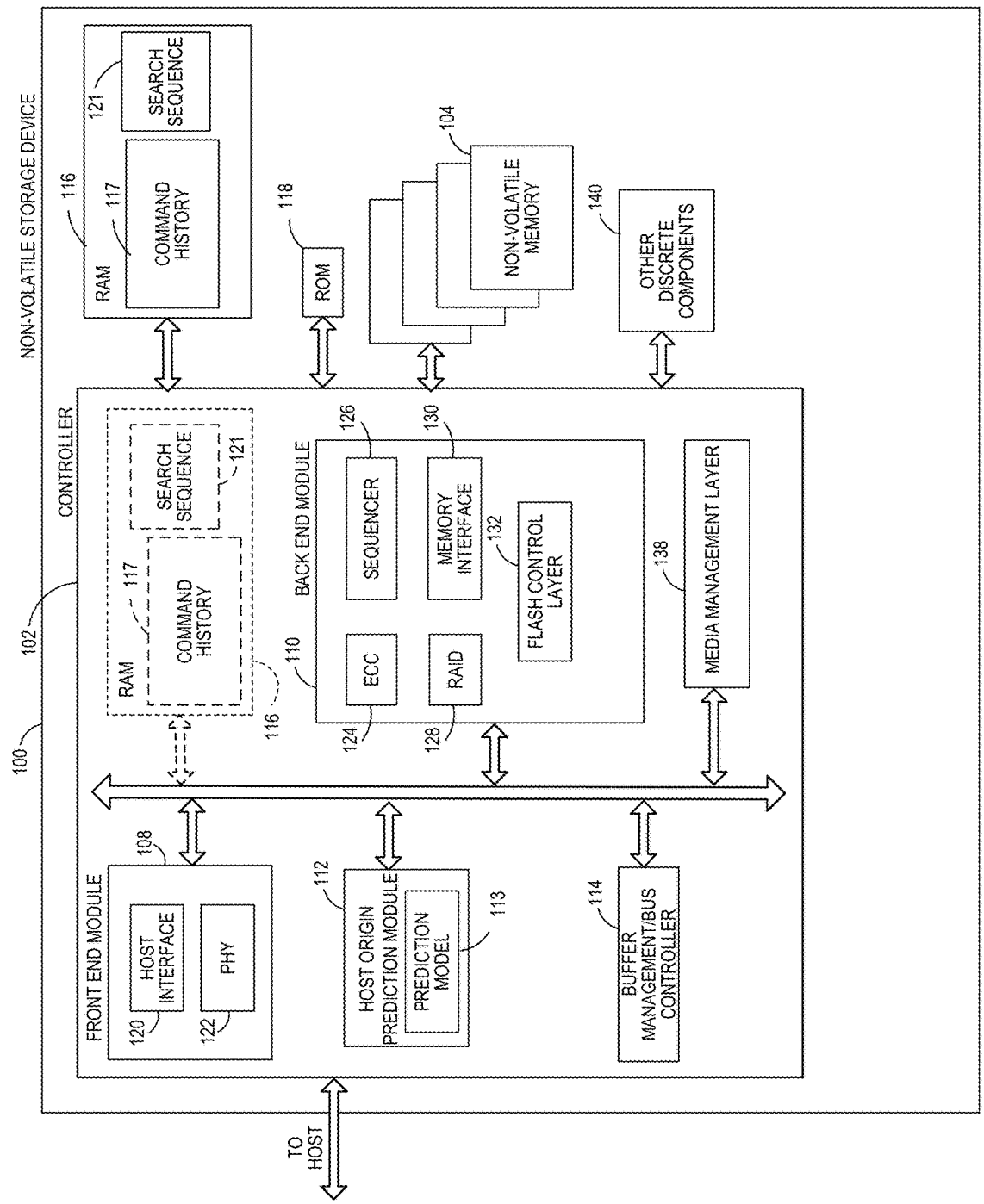
FIG. 2A is a block diagram illustrating exemplary components of a controller of a non-volatile memory system.

FIG. 2A is a block diagram illustrating exemplary components of controller 102 in more detail. Controller 102 includes a front-end module 108 that interfaces with a host, a back-end module 110 that interfaces with the one or more non-volatile memory die 104, and various other modules that perform functions that will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a host origin prediction module 112 present on the die of the controller 102. As described below, the host origin prediction module 112 may provide functionality for predicting the host that will next issue a next command to the storage device before the next command is received and then configuring the storage device with host memory configuration parameters associated with that predicted host. The host origin prediction module 112 of the controller 102 may accomplish this by use of a prediction model 113 and a command history data structure 117. The prediction model 113 may include any of a number of known prediction algorithms that utilize state tables, machine learning based predictive modeling, or pattern matching. The types of prediction algorithms may include both statistical estimators and machine-learning based methods—such as maximum-a-posteriori (MAP) estimation, logistic-regression, and decision trees. Additionally, simple pattern matching techniques or more sophisticated neural networks such as those based on Stochastic Gradient Descent techniques or many other known methods may be used by the controller for making the host origin prediction of a next command in different implementations.

Prediction via pattern matching may be implemented by comparing a pattern of host origin identification of a current command and a predetermined number of prior commands and comparing that search sequence 121 to sequentially ordered prior commands in a command history datastore 117, such as a database or other data structure. If the search sequence 121 matches a sequential pattern of host identifiers in the command history datastore 117, the host origin prediction module 112 will select the next host immediately following the matched sequence in the datastore and use that to identify the predicted next host and to configure the storage device with the host memory configuration parameters for that predicted host. As also described in greater detail herein, in other implementations of pattern matching a large command history datastore 117 and sequential comparison of a search sequence 121 to that datastore may be avoided by the pre-fetch module generating a smaller type of datastore for the command history and then utilizing a many-to-one conversion of search sequences to search the abridged command history.

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die.

The RAM 116 in the NVM system 100, whether outside the controller 102, inside the controller or present both outside and inside the controller 102, may contain a number of items, including a copy of one or more pieces of the logical-to-physical mapping tables and group address tables (GAT) for tracking mappings between logical groups for the NVM system 100. The RAM 116 may contain the command history datastore 117 that, in one embodiment, may be a sequential list of host origin identifiers for prior command, where sequential in this context refers to the fact that the list is organized in the time ordered sequence of arrival of the prior commands at the controller 102. The RAM 116 may also include a search sequence 121 of the host identifier for the current command and for a fixed number of sequentially prior commands. As described in greater detail below, this search sequence may be used to compare against the command history to predict the host that will issue the next command data.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
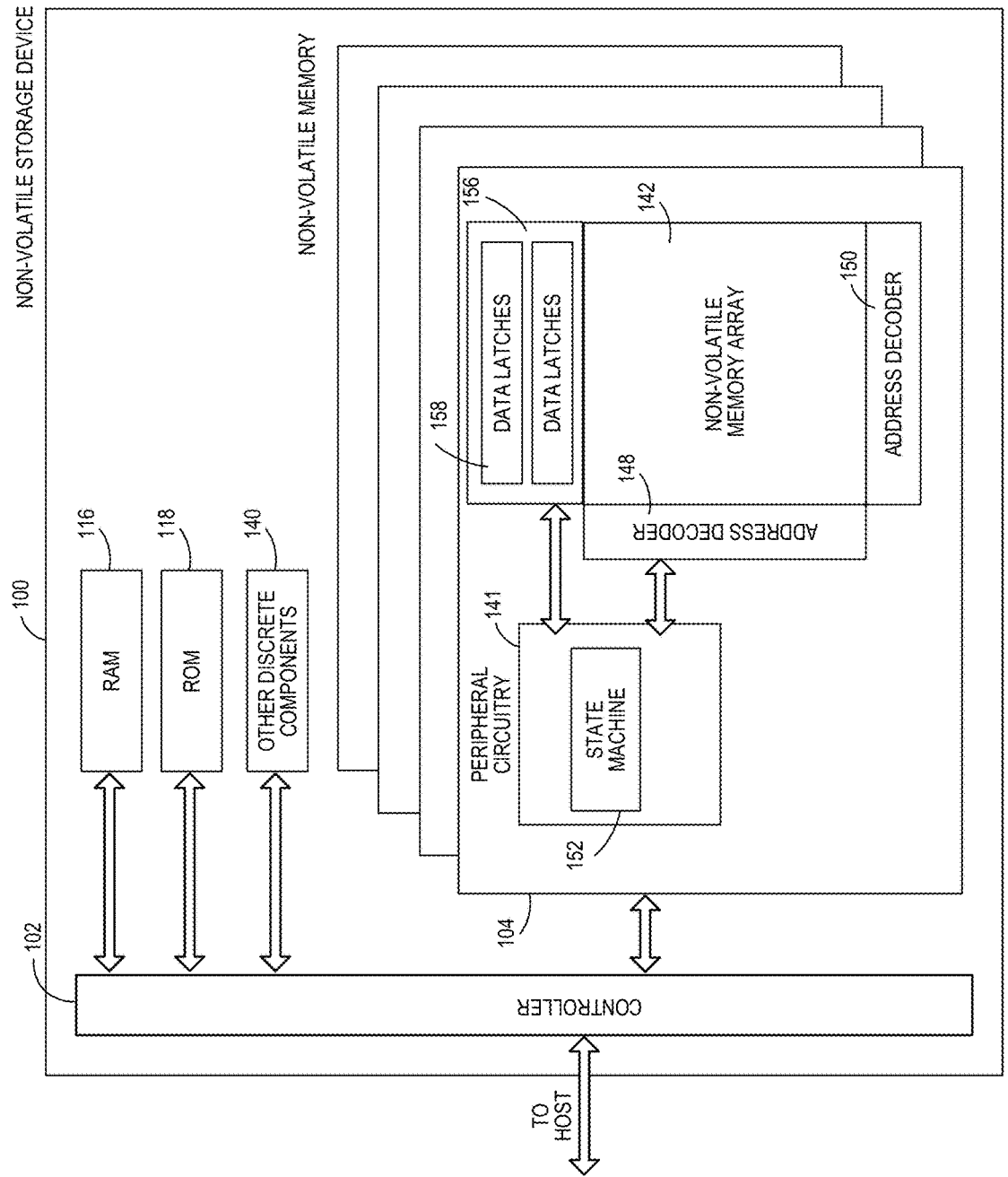
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and includes address decoders 148, 150. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
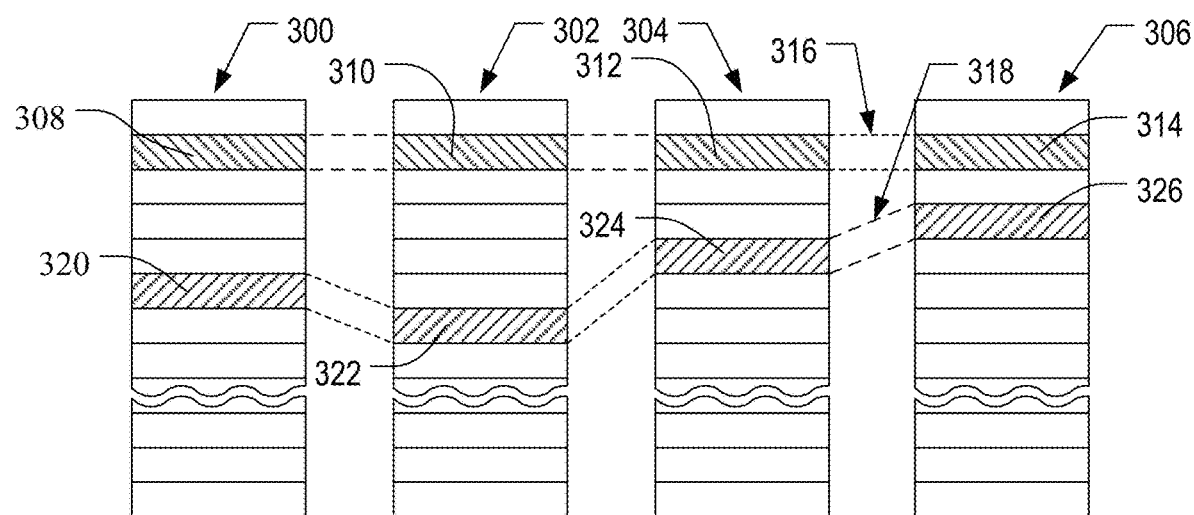
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
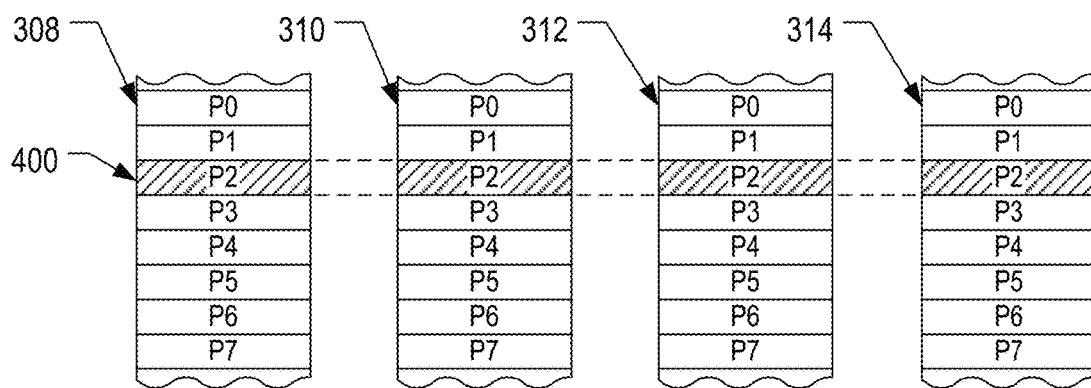
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 5:
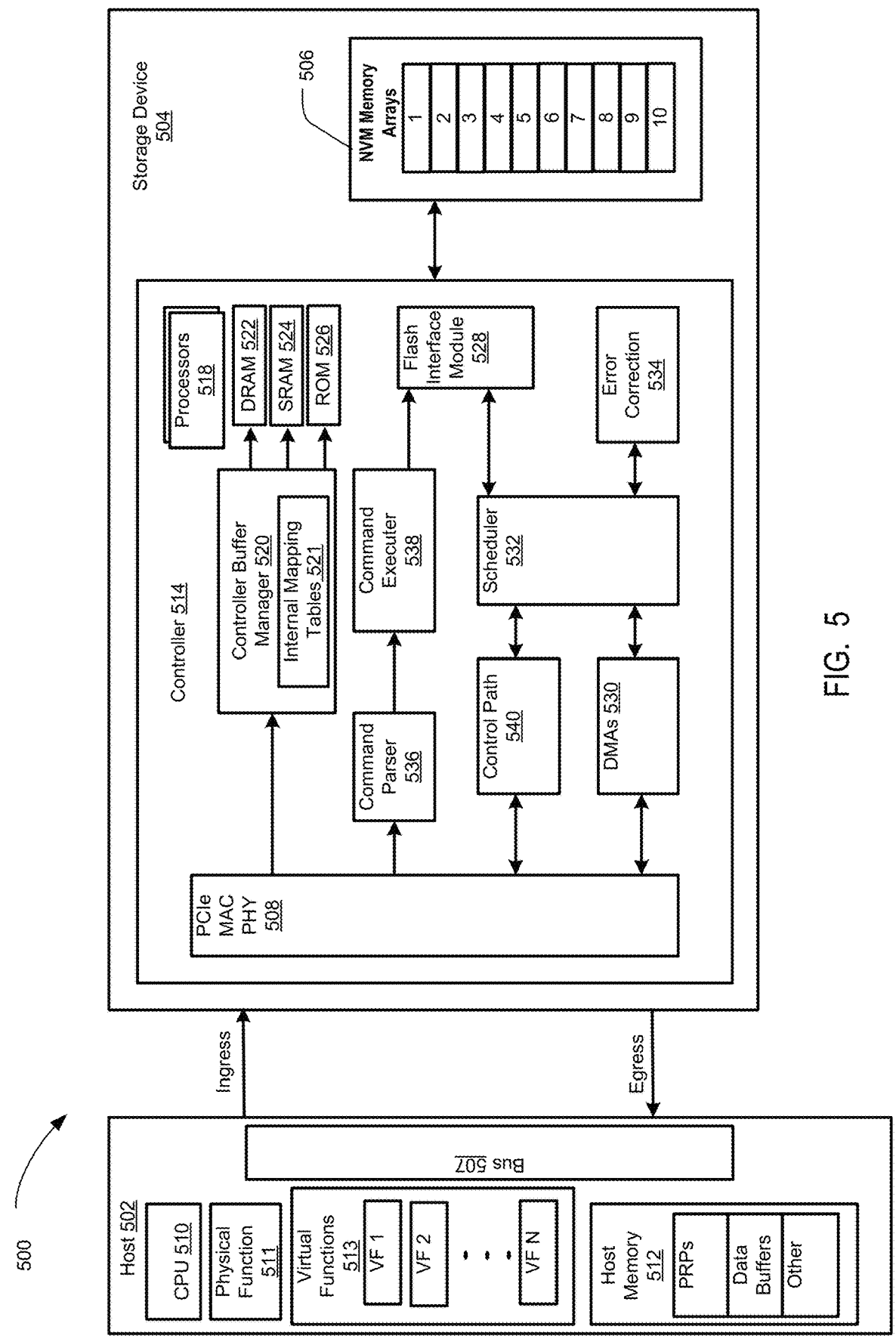
FIG. 5 is a block diagram of an embodiment of the storage device of FIG. 2A implementing peripheral component interface express (PCIe) and non-volatile memory express (NVMe) functionality that is communicating with a virtualized host.

A more detailed schematic illustration of an embodiment of the system of FIGS. 1-2 utilizing a PCIe interface and NVMe protocol is shown in FIG. 5. The system 500 includes a host 502 and a storage device 504 (also referred to as a storage device), such as a solid state drive (SSD). Host 502 may utilize a non-volatile memory (NVM) 506 included in storage device 504 to write and to read data, such as for long-term memory storage. Storage device 504 may be an internal storage drive, such as a notebook hard drive or a desktop hard drive. Storage device 504 may be a removable mass memory device, such as, but not limited to, a handheld, removable memory device, such as a memory card (e.g., a secure digital (SD™) card, a micro secure digital (micro-SD™) card, or a multimedia card (MMC)) or a universal serial bus (USB) device. Storage device 504 may take the form of an embedded mass memory device, such as an embedded SD (eSD)/embedded MMC (eMMC) embedded flash drive, embedded in host 502. Storage device 504 may also be any other type of internal storage device, removable storage device, embedded storage device, external storage device, or network storage device.

Host 502 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 502 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 502 includes a central processing unit (CPU) 510 connected to a host memory space 512, such as DRAM or other main memories. An application program may be stored to memory space 512 for execution by components of the host 502.

Host 502 includes a bus 507, such as a memory device interface, which interacts with a host interface 508, which may include media access control (MAC) and physical layer (PHY) components, of storage device 504 for ingress of communications from host 502 to storage device 504 and egress of communications from storage device 504 to host 502. Bus 507 and host interface 508 operate under a communication protocol, such as a Peripheral Component Interface Express (PCIe) serial communication protocol or other suitable communication protocols. Other suitable communication protocols include Ethernet, serial attached SCSI (SAS), serial AT attachment (SATA), any protocol related to remote direct memory access (RDMA) such as Infiniband, Internet Wide-area RDMA Protocol iWARP, or RDMA over Converged Ethernet (RoCE), and other suitable serial communication protocols. Storage device 504 may also be connected to host 502 through a switch or a bridge. A single host 502 is shown connected with the storage device 504, and the NVMe single root input/output virtualization (SR-IOV) single host virtualization protocol supported as discussed in greater detail below, where the storage device 504 may be shared by multiple hosts, where the multiple hosts may be a physical function 511 and one or more virtual functions 513 of a virtualized single physical host system. In other embodiments, it is contemplated that the NVMe multi root input/output virtualization (MR-IOV) standard for virtualizing multiple physical hosts may be implemented with features of the disclosed system and method.

The NVM 506 of storage device 504 may be configured for long-term storage of information as non-volatile memory space and retains information after power on/off cycles. In the same manner as described with respect to FIGS. 1-2, NVM 506 in FIG. 5 may consist of one of more dies of NAND flash memory. Other examples of non-volatile memory include phase change memories, ReRAM memories, magnetoresistive random access memories (MRAM), magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 504. Each platter may contain one or more regions of one or more tracks of data. NVM 506 may include one or more types of non-volatile memory.

Storage device 504 includes a controller 514 which manages operations of storage device 504, such as writes to and reads from NVM 506. Controller 514 may include one or more processors 518, which may be multi-core processors.

Processor 518 handles the components of storage device 504 through firmware code. Controller 514 may operate under NVM Express (NVMe) protocol, but other protocols are applicable. The NVMe protocol is a communications interface/protocol developed for SSDs to operate over a host and a storage device that are linked over a PCIe interface. The NVMe protocol provides a command queue, also referred to as a command submission queue or simply as a submission queue, and completion path for access of data stored in storage device 504 by host 502.

Controller 514 also includes a controller buffer manager 520. Controller buffer manager 520 may be connected to a dynamic random access memory (DRAM) 522, to a static random access memory (SRAM) 524, and to a read-only memory (ROM) 526. The controller buffer manager 520 may also communicate with the NVM 506 through a flash interface module 528. DRAM 522 and SRAM 524 are volatile memories or cache buffer(s) for short-term storage or temporary memory during operation of storage device 504. Volatile memories do not retain stored data if powered off. DRAM generally requires periodic refreshing of stored data while SRAM does not require refreshing. While SRAM typically provides faster access to data than DRAM, it may also be more expensive than DRAM.

Controller 514 executes computer-readable program code (e.g., software or firmware) executable instructions (herein referred to as "instructions"). The instructions may be executed by various components of controller 514, such as processor 518, logic gates, switches, application specific integrated circuits (ASICs), programmable logic controllers, embedded microcontrollers, and other components of controller 514.

The instructions executable by the controller 514 for carrying out the embodiments described herein are stored in a non-transitory computer readable storage medium. In certain embodiments, the instructions are stored in a non-transitory computer readable storage medium of storage device 504, such as in a read-only memory (ROM) or NVM 506. Instructions stored in the storage device 504 may be executed without added input or directions from the host 502. In other embodiments, the instructions are transmitted from the host 502. The controller 514 is configured with hardware and instructions to perform the various functions described herein and shown in the figures.

Storage device 504 may also include other components, such as flash interface module 528, a direct memory access (DMA) module 530, a scheduler 532, an error correction module 534, a command parser 536, a command executor 538, and a control path 540. Flash interface module 528 interacts with the NVM 506 for read and write operations. DMA module 530 executes data transfers between host 502 and storage device 504 without involvement from CPU 510. Scheduler 532 controls the data transfer while activating the control path 540 for fetching physical region pages (PRPs), posting completion and interrupts, and activating the DMAs 530 for the actual data transfer between host 502 and storage device 504. Error correction module 534 corrects the data fetched from the memory arrays in the NVM 506. Command parser 536 parses commands to command executor 538 for execution on flash interface module 528.

Figure 6:
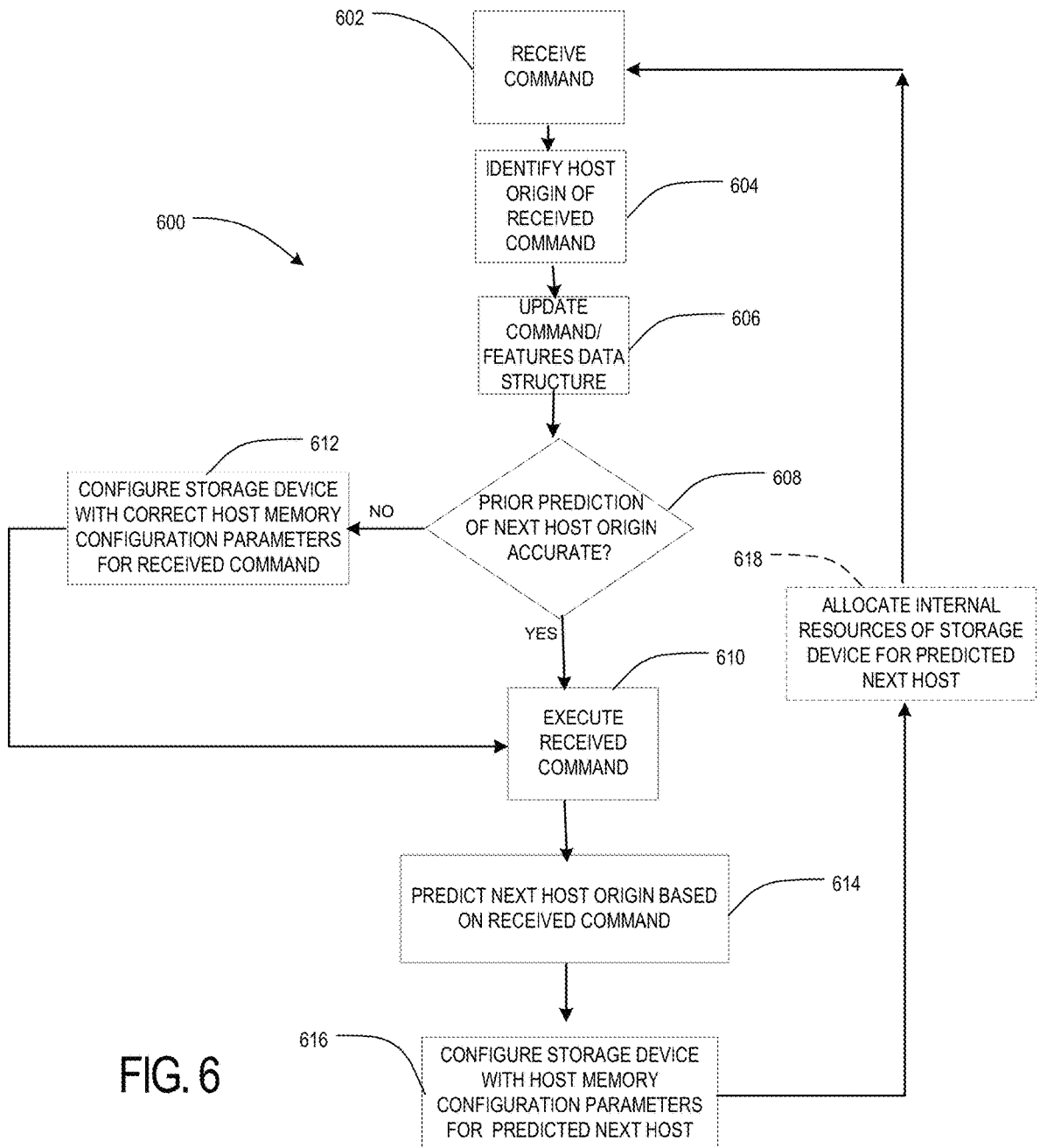
FIG. 6 is a flow diagram illustrating one embodiment of a method for predicting the host origin of a next command and configuring the storage device with host memory configuration parameters for the predicted host.

Referring now to FIG. 6, a flow diagram shows an embodiment of a method 600 for predicting the host origin of next commands and configuring the storage device with the host memory configuration parameters for that predicted next host. A host command is received at the storage device from one of the plurality of hosts in communication with the storage device (at 602). The controller of the storage device determines the host from which the command was received (host origin) of the command (at 604). In one implementation it is contemplated that each host command received includes a unique host identifier that expressly identifies the host of origin of the command. In alternative embodiments, other methods for recognizing or inferring the host origin of a command may be used.

A command/features datastore may be used to track the host order sequence of previous actual host commands. The datastore may be a list, table, database or any other form of data structure that will be used to store features for applying standard prediction algorithms. In one implementation, the datastore may simply be composed of the previous actual host order sequence (e.g. a sequence of Host B, Host A, Host B, Host C and so on . . . ), or may include more features (such as previous command durations, lengths, type of command, etc.). For purposes of predicting a next host from which a command is expected, at least the host origin of each command may be included in the datastore when the controller updates the command/features data structure (at 606).

Whenever a command is received, the accuracy of a prior prediction may be examined by the controller (at 608). If the prior predicted host origin matches the host origin of the received command, then the correct host memory configuration parameters have been retrieved and the storage device is configured to properly handle and execute the host command from the host that sent the received command (at 608, 610). However, if the prior predicted next host origin was not accurate and the received command is from a different host than last predicted, the storage device must configure the host memory configuration parameters with the parameters for the host origin of the actual received command before then executing that command (at 608, 612, 610).

The process 600 of FIG. 6 proceeds with then also predicting, based on the current received command, the host origin of a next command to be received from the multiple hosts in communication with the storage device (at 614). Using the data structure, the controller may utilize any of a number of know prediction models or techniques to predict the host origin of the next command received at the storage device (at 608). These prediction algorithms may include both statistical estimators and machine-learning based methods—such as maximum-a-posteriori (MAP) estimation, logistic-regression, and decision trees. Additionally, simple pattern matching techniques or more sophisticated neural networks such as those based on Stochastic Gradient Descent techniques or many other known methods may be used by the controller for making the host origin prediction of a next command in different implementations.

Once the prediction has been made of the host origin for a next command, the controller may retrieve the host memory configuration parameters for that predicted host and update the storage device with the set of configuration parameters associated with the predicted host (at 616). The timing of retrieving the set of host memory configuration parameters for the predicted host and updating the storage device with them may vary in different embodiments. In one embodiment, the set of host memory configuration parameters may be immediately retrieved when the prediction is made, but the update to the storage device made only after completing the current command when the storage device is in an idle period and no other host commands are pending. Thus, the configuration using the identified and retrieved set of host memory configuration parameters may occur prior to receipt of the next command but after finishing the current command. Additionally, there may be instances where the predicted next host is the same as the host source of the current command and so no reconfiguration may be needed.

As discussed further below, the sets of host memory configuration parameters may include multiple different parameters settings and be stored in volatile or non-volatile memory of the storage device and identified by a unique host identifier for each host. In one implementation the host origin prediction module 112 of the controller 102 may configure the storage device with all of the parameter settings in the set of parameters for that predicted host. In alternative embodiments, if there is a tie or a close statistical probability of two different hosts as being the next host source, then the controller may still configure the storage device with some of the parameters in the set of configuration parameters where the parameters happen to be the same between both of the likely next host candidates. Optionally, the predicted next host information may be further utilized by the controller of the storage device to also allocate some of the internal resources of the storage device before receiving the next command (at 618). The internal resources may be internal storage memory (e.g. internal cache space in controller RAM) that is assigned to store metadata to help the controller 102 handle the current host. The metadata may include NVMe parameters discussed herein and/or may include statistics on the host to help with predicting a workload for the host. This speculative resource allocation may be done in order to accelerate the execution time of the next command, assuming an accurate prediction has been made of the next host. The tasks that may be executed before receipt of a command from the predicted host may include populating internal caches with data or metadata relevant to the predicted host.

In an NVMe virtualized environment, such as illustrated in the example of FIG. 5, the multiple virtual functions 513 (VF 1, VF 2 through VF N), also referred to herein as virtual hosts, and the physical function 511 all may access the storage device 504 as separate hosts. Each of these separate hosts may have completely different host memory configuration parameters for the storage device. As noted previously, the process of switching the storage device 504 between the different respective sets of host memory configuration parameters when switching between commands from different hosts can take time. Thus, the process of predicting the next command host origin and configuring the storage device with the appropriate host memory configuration parameters before that next command host origin, may reduce latency and improve performance of the storage device.

Figure 7:
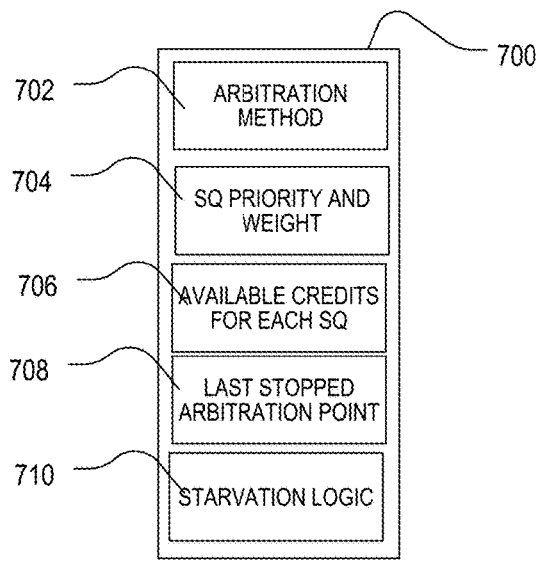
FIG. 7 illustrates an embodiment of a set of host memory configuration parameters that may be used by the storage device to implement the method of FIG. 6.

The type of host memory configuration parameters that are configured may depend on the type of virtualized environment. In the NVMe virtualized environment, a number of different configuration parameters are defined by the NVMe standard and may be configured for the different virtual hosts. Among other potential parameters, the host memory configuration parameters may include command submission queue weighting, priority and arbitration method parameters. An example of a set of host memory configuration parameters 700 is illustrated in FIG. 7. The set 700 may include an arbitration method parameter 702, submission queue priority and weight parameters 704, an available number of credits for each submission queue 706, the recorded last stopped arbitration point 708, and a starvation logic parameter 710. Multiple sets 700 of the host memory configuration parameters, one set for each host (virtual host) maybe stored in volatile memory 104 or non-volatile memory 116 of the storage device 100 based on information provided by each host (virtual host) upon initialization of the storage device.

Figure 8:
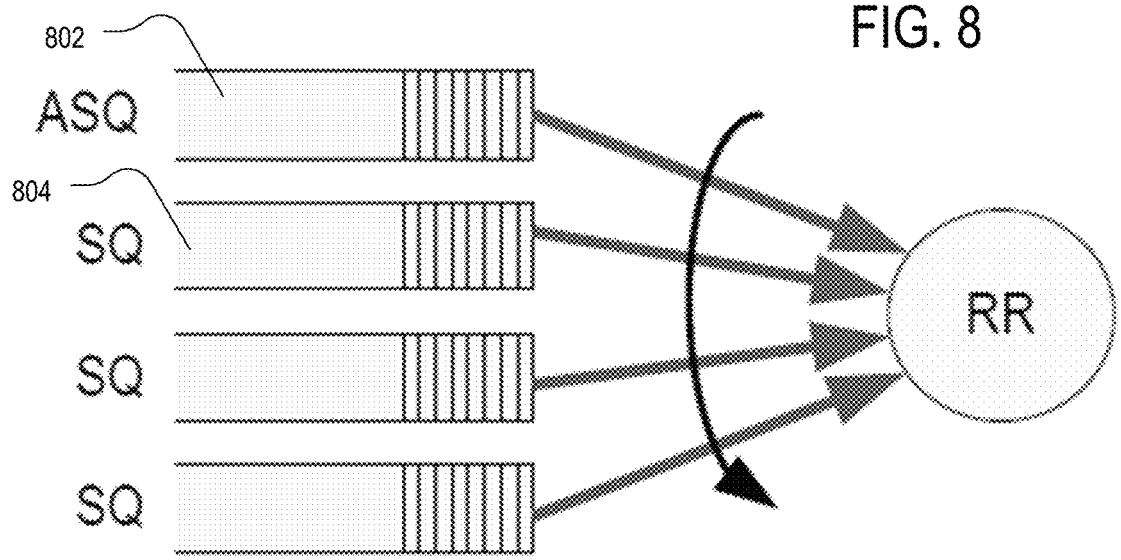
FIG. 8 is an example of an arbitration method parameter of FIG. 7.

With respect to the arbitration method parameter 702, the NVMe standard defines three categories: a round robin (RR) algorithm, a weighted round robin (WRR) algorithm, and a vendor-specific algorithm. As illustrated in FIG. 8, if the round robin (RR) arbitration mechanism is indicated in the arbitration method parameter 702 for a given virtual host, the controller will implement round robin command arbitration among all submission queues (SQs) 804, including the administrative submission queue (ASQ) 802 for the virtual host. All SQs are treated with equal priority in the RR arbitration method. The controller may select multiple candidate commands for processing from each SQ per round based on the arbitration burst setting (the maximum number of commands that the controller may launch at one time from a particular submission queue) for the virtual host.

Figure 9:
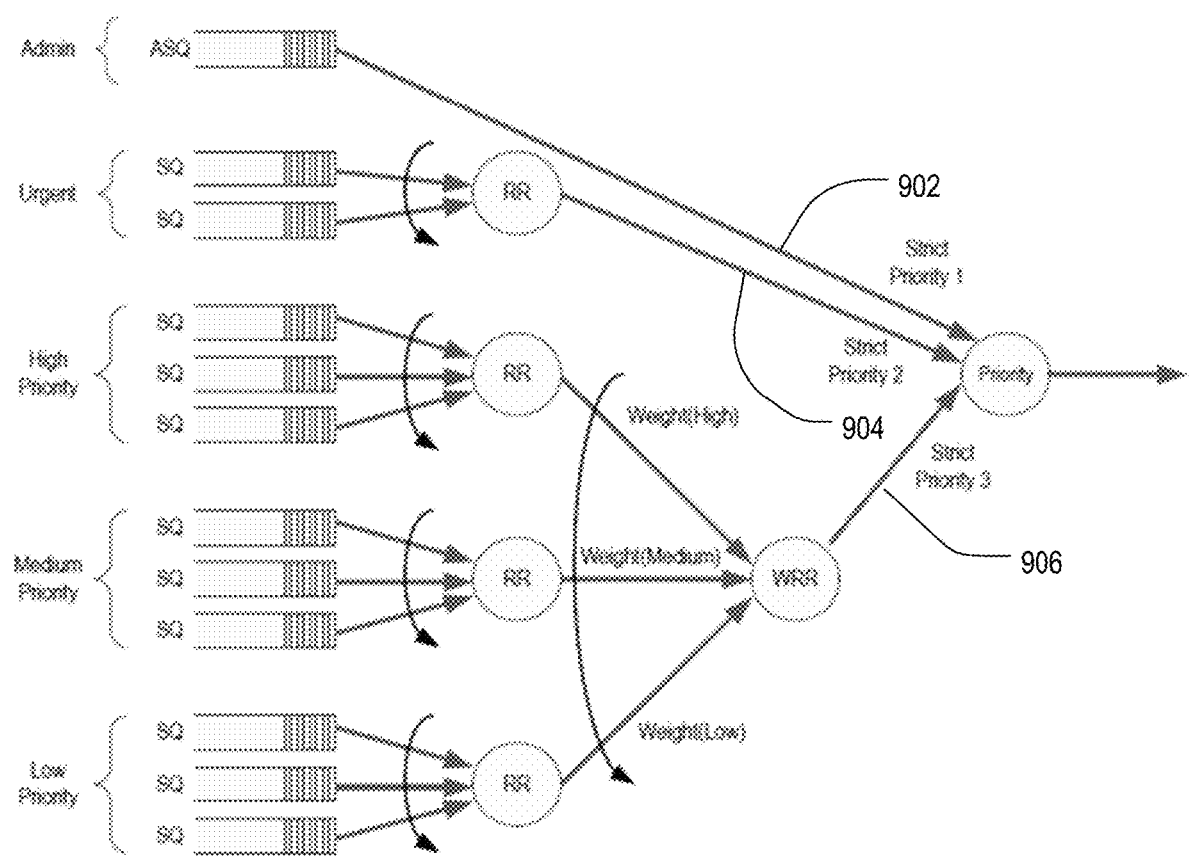
FIG. 9 is an alternative example of the arbitration parameter of FIG. 7.

An example of the weighted round robin (WRR) algorithm with urgent priority class arbitration, on a virtual host having a different arrangement of submission queues than shown in FIG. 8 is illustrated in FIG. 9. In this arbitration mechanism, there are three strict priority classes 902, 904, 906 and three weighted round robin priority levels. If Submission Queue A is of higher strict priority than Submission Queue B, then all candidate commands in Submission Queue A will start processing before candidate commands from Submission Queue B start processing. The highest strict priority class 902 is the Admin class that includes any command submitted to the ASQ. This class has the highest strict priority above commands submitted to any other Submission Queue. The next highest strict priority class 904 is the Urgent class of SQs. Any SQ assigned to the Urgent priority class is serviced next after commands submitted to the ASQ, and before any commands submitted to a weighted round robin priority level. There is the potential to starve Submission Queues in the weighted round robin priority levels as there is no fairness protocol between Urgent and non-Urgent Submission Queues. The lowest strict priority class 906 is the Weighed Round Robin class. This class consists of the three weighted round robin priority levels (High, Medium, and Low) that share the remaining bandwidth using weighted round robin arbitration. Host software controls the weights for the High, Medium, and Low service classes via Set Features. Round robin is used to arbitrate within multiple Submission Queues assigned to the same weighted round robin level. The number of candidate commands that may start processing from each Submission Queue per round is either the Arbitration Burst setting or the remaining weighted round robin credits, whichever is smaller. The third arbitration method, vendor-specific, defined in NVMe simply permits a vendor to designate an alternative logic to the RR and WRR logic mechanisms if desired Referring again to FIG. 7 and the available credits for each SQ 706, the credits may refer to credits or tokens that are assigned to each SQ for a given virtual host to control, for example, power or bandwidth usage. A certain number of these credits may be needed to allow execution of a command from a particular SQ and storing the current values for these credits in the available credits 706 for the virtual host when switching between virtual hosts allows that host to maintain continuity of operation the next time a command is sent to the storage device from that host. The last stopped arbitration point parameter in each set 700 may represent the point in each set of queues that the last arbitration algorithm stopped at so that the arbitration algorithm knows where to pick up with command selection from the various queues when the next command from that host is to be executed by the storage device 100. Finally, the starvation logic 710 refers to the logic used by the particular host to counter "starvation" problems when priorities or arbitration methods may prevent commands from certain queues from ever being selected for execution. In one implementation, all of the parameters 702-710 in a set 700 of host memory configuration parameters are calibrated for the predicted host when the storage device predicts a next host origin for a next command.

Referring to the prediction mechanisms available for use by the storage device (see step 614 of FIG. 6), one simplified prediction technique may be to store a sequence of prior host origins for earlier commands in the order the commands were received, and then to take the identified host origin for a more limited size search sequence of current command and one or more chronologically prior host commands and find a match. In this simplified prediction technique, a command received from one of the hosts (for example physical function 511 or virtual functions 513 of a virtualized host 502), the command may include host identifier information identifying the host origin of that command. Upon receipt of the command, the host origin prediction module 112 of the controller 102 may update the command history datastore 117 to include an entry containing the host identifier. The controller 102 may also generate a search sequence in a search sequence stack stored in the controller memory. The search sequence, which is a pattern of recent host commands, consists of a sequential list of host identifier information from the current command and from a previous N commands, where N may be a predetermined fixed integer. For example, in one implementation, N may be 8, and thus the search sequence would be the host identifier information for the current command and the last 7 prior read commands arranged in a list or stack in time order of command receipt. The search sequence stack may be a fixed-size search sequence buffer 121 in RAM 116 having space to hold N entries, where the oldest entry is removed from search sequence buffer 121 when the host identifier information from the current command is inserted. Although the example search sequence (also referred to herein as a search sequence stack) example provided below assumes a set of N previous commands in addition to the current read command where N is greater than 0, in other implementations the entire search sequence may comprise only a single prior command such as the current command.

Using the search sequence, the controller 102 may search for any occurrences of the search sequence that appear in the command history datastore 117 that may be a database or other data structure containing prior host command order data. Any of a number of database search techniques may be used by the controller 102 to try to find a match between the search sequence and command data entries in the time ordered command data entries of the datastore 117. For example, the search technique may include comparing the search sequence in the search sequence buffer 121 to the time ordered entries in the command datastore 117 in reverse time order (from newest entries to oldest entries) until a match is found. Alternatively, the search sequence may be compared to the datastore entries in the opposite direction, starting with the oldest datastore entries up until the newest. In one embodiment, the controller 102 may scan the entire datastore looking for every match, or in other embodiments, the controller 102 may stop searching after finding a first match, or stop searching after any of a number of other pre-defined match scenarios.

If at least one match is found to the search sequence in the command datastore then the host origin prediction module of the controller 102 may retrieve the host identifier in the command history entry immediately after (more recent in time order) the matched sequence. This retrieved host identifier is then considered to be the predicted host source of a next command to be received at the storage device. The controller 102 may then retrieve the appropriate set 700 of host memory configuration parameters for that predicted host out of a plurality of sets 700 stored in RAM 116 and configure the storage device with those parameters prior to receiving the next host command. In one implementation, the controller 102 may queue the configuration changes until after the current command is finished and the storage device is otherwise in an idle state. If no match is found, or if the next command does originate for the predicted host, then time may be saved by already having started, and potentially finished, configuring the storage device with the appropriate set 700 of host memory configuration parameters. If the next command does not originate from the predicted host, then the correct set 700 may instead be identified for the host identifier in the actual next command and a time savings will not be realized.

The accuracy and amount of time it takes to predict the host origin for the next command may be adjusted by adjusting the size of the command history datastore 117 and the size of the search sequence buffer 121. In one implementation, the command history datastore may be sized to hold host identifier (and optionally additional information such as command type) information for 200,000 of the most recent commands and the search sequence buffer 121 as discussed above, holds host origin information for the 8 most recent commands (providing space for of the last 7 commands and the most recently received command). The larger the command history datastore 117, the more likely it may be to find a match, but the time needed to parse the entire datastore and compare it to the search sequence also may increase. Similarly, length of the search sequence buffer 121 may be adjusted to suit the specific memory device application. For example, a longer search sequence (and thus larger search sequence buffer 121) may reduce the frequency of matches found if the memory device tends to have shorter patterns of commands, and too short of a search sequence may result in more matches but less accurate predictions. The above-noted example sizes of the command history datastore 117 and the search sequence buffer 121 are simply provided by way of example and other larger or smaller sizes for each may be implemented in different embodiments.

Referring to FIG. 10A, a graphical example of the controller parsing the command history datastore 117 by comparing the entries of the search sequence buffer 121 to the entries of the command history datastore is shown. The search sequence is represented in FIG. 10A as a search window 1004 containing the time ordered host identifiers for the last 8 (in this example) received commands including the current received command, in chronological order by time of receipt by the controller. Starting with the most recent read command entries 1002 in the continuous chronologically ordered linked list 1000 of prior command host identifier information in the command history datastore 117, the controller compares this window 1004 of the search sequence to 8 command history datastore entries 1002 at a time. The controller 102, via the host origin prediction module 112, searches by effectively sliding the search window 1004 one entry 1002 at a time looking for a match between the search sequence and the sequence entries covered by the search window 1004. As illustrated in FIG. 10B, when the order of host identifiers in the search sequence, represented by the search window 1004, matches the current pattern of host identifiers for prior command entries 1002 being compared to the search window 1004, the host identifier in the first command entry after the matched prior entry pattern (next most recent in time) is identified as the predicted next host 1006 from which a next command will issue. If multiple matches are found having differing results for the predicted next host, then host selected as the predicted host for the next command may be the host from the most recent command in the command datastore 117 that matches the search sequence 1004. Alternatively, the predicted host may be chosen from the host identifier that occurs most frequently in the pattern matches that are found for that search sequence.

Figure 11:
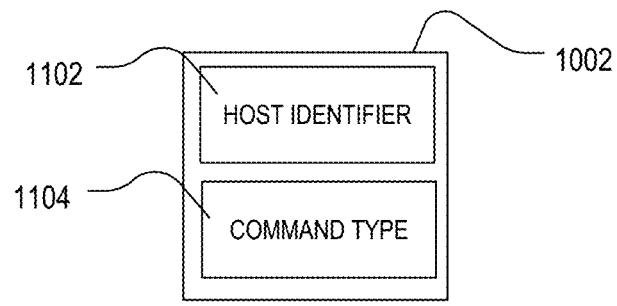
FIG. 11 is an example command history datastore entry.

FIG. 11 shows one embodiment of a format for a command history entry 1002 that may be used in the command history datastore 117. In the embodiment of FIG. 11, each entry 1002 may represent a single previously received command. The entry 1002 may include host identification field 1102 and, optionally, one or more additional fields such as command type 1104. The command type may be an identifier for a read, write or erase command in one implementation. Because a predicted host origin is the goal of the embodiment of FIG. 6, the command type or any other information specific to the command is not needed in command history entries 1002 in one implementation. In alternative embodiments, other parameters relating to the prior received commands could also be included in a command history entry 1002, such as command type 1104, command length, logical address information or other "metadata"—type of parameters, including error correction code (ECC) configurations and flash parameters or configurations relating to the command.

It should be noted that the search to find a match between the search sequence 1004 and linked list 1000 in the command history datastore 117 may be based on matching only the sequence of host identifier fields 1102 in both. In other embodiments, more than one field for each search sequence entry and each command history entry may be required to match. Also, a match is considered to be a 100% match of the fields being compared in the search sequence and the command history entries. In alternative embodiments, it is contemplated that a fixed amount of matches between the search sequence and the command history entries less than 100% may be considered a match for purposes of identifying a predicted next read command.

The embodiments discussed above address ways of predicting next a host origin of a next commands where a pattern of host command order is searched for from a comparison of a search sequence to a relatively large and continuous time-ordered datastore, in one non-limiting example the datastore may be a database, of command history. In certain implementations, the storage device may have a limited amount of memory in which to store prior command history, or may have other constraints that require less processing time or faster pattern matching capabilities than the embodiments of FIGS. 10-11 may be able to provide, as these embodiments are based on a relatively long search operation for each pattern matching occasion. Having a smaller amount of command history data may result in somewhat less accurate read command prediction capability, however that may be an acceptable tradeoff for lowering the amount storage space needed for the read prediction process and increasing the speed (decreasing the latency) of the pattern matching operation. As discussed in greater detail below, any of a number of algorithms, such as a hash-based algorithm, may be implemented to reduce the size of or access time to the history pattern matching information.

Figure 12:
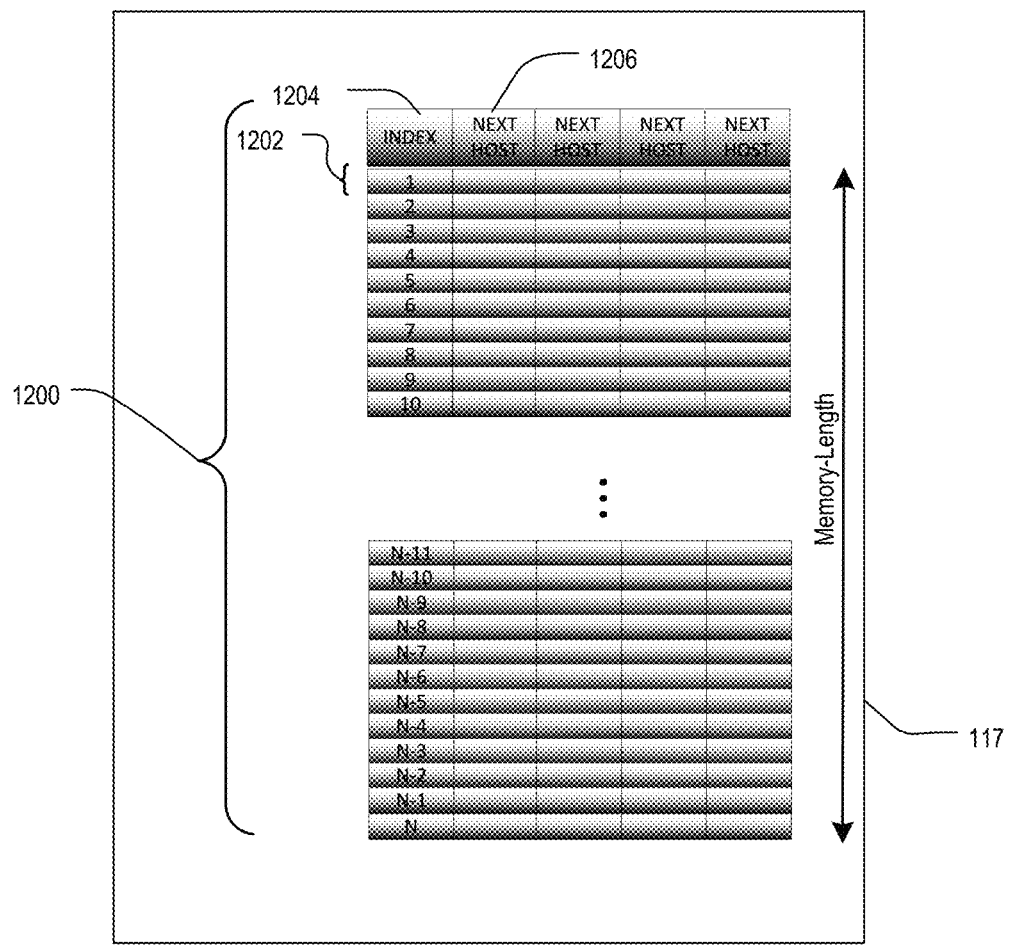
FIG. 12 is an example of a command history datastore having a finite number of hash-indexed entries.
Figure 13:
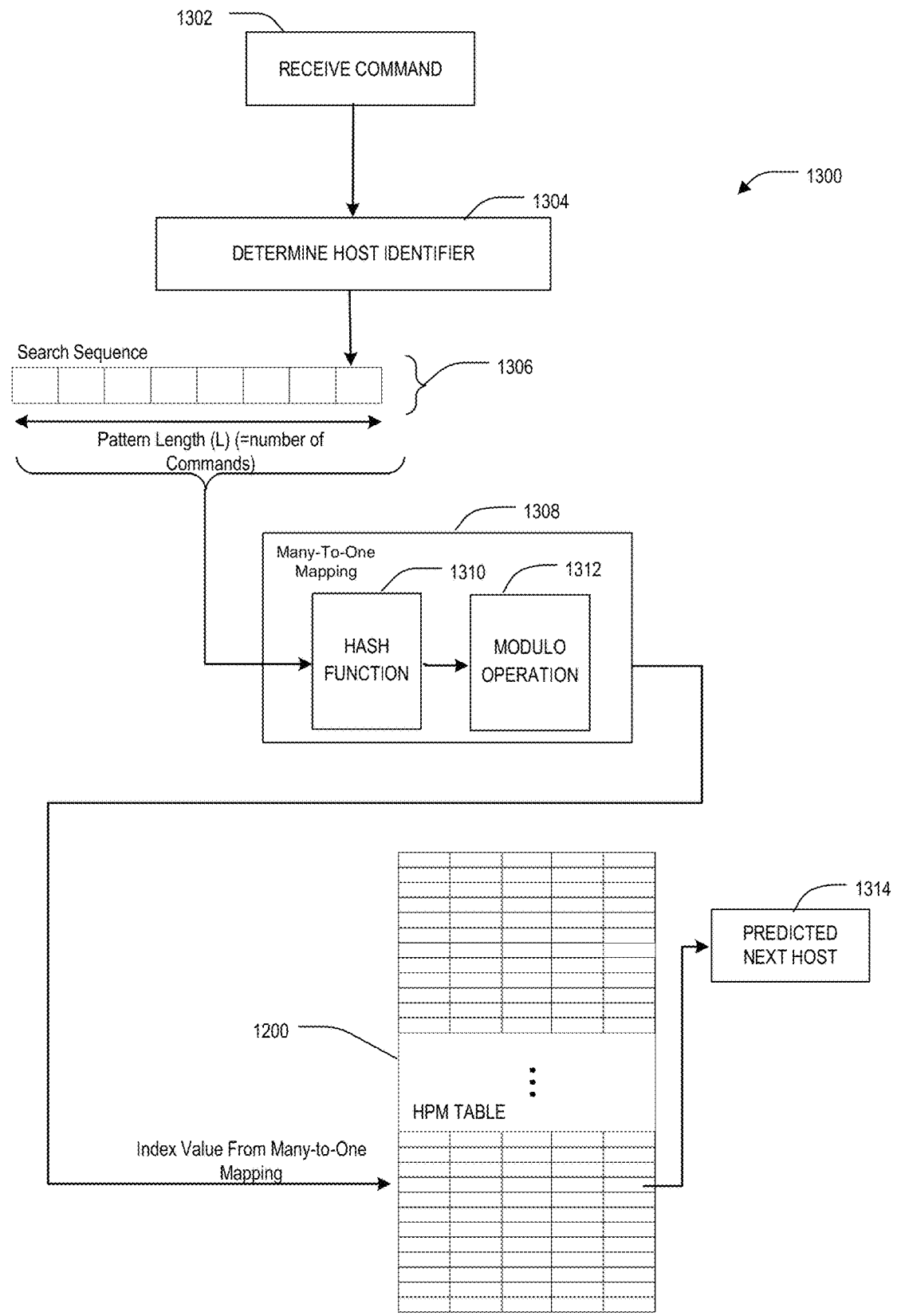
FIG. 13 is a flow diagram illustrating a process for predicting a next host origin of a command with the command history datastore of FIG. 12 using a many-to-one indexing process.
Figure 14:
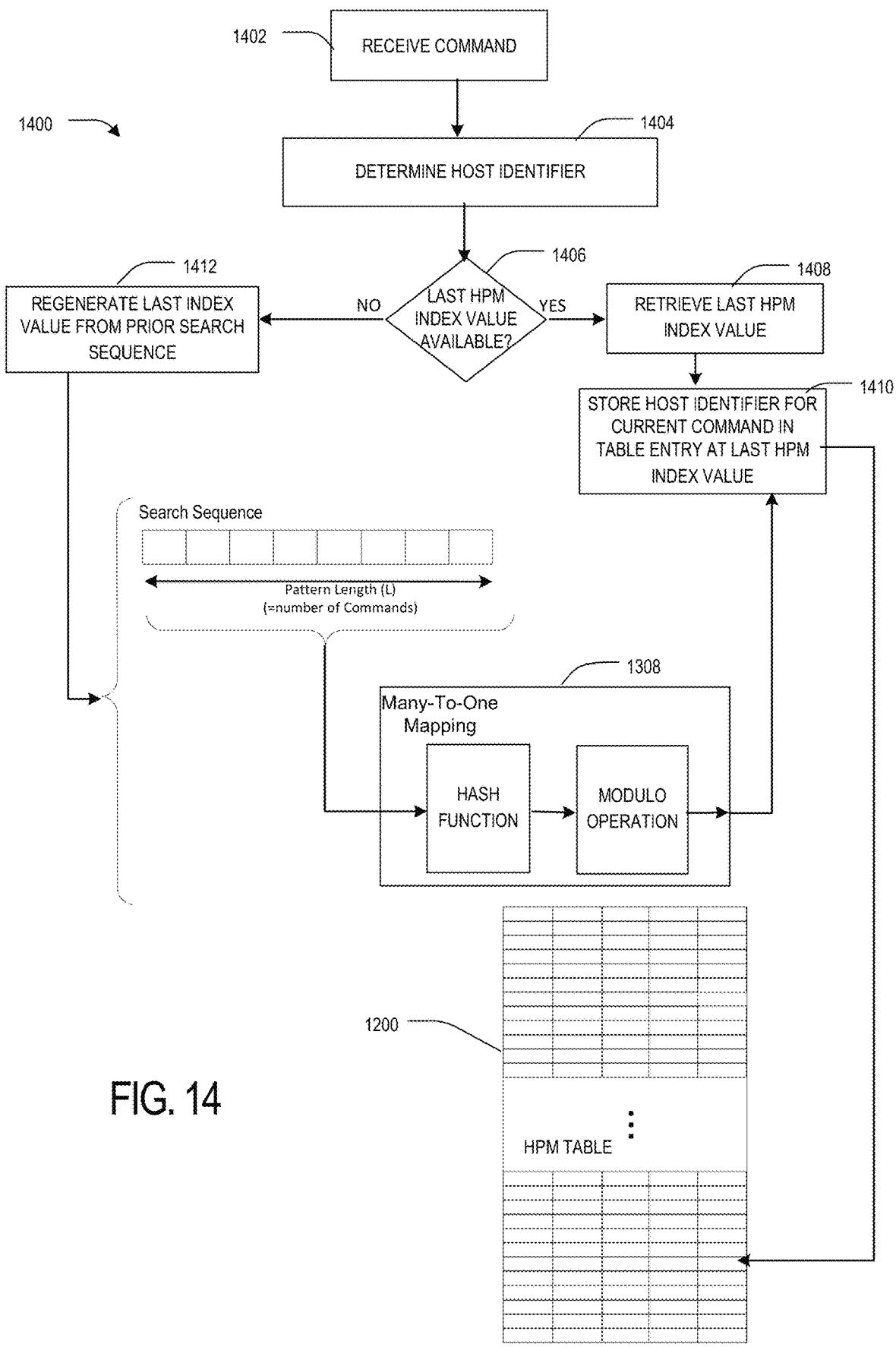
FIG. 14 is a flow diagram illustrating a process for updating the command history datastore of FIG. 12 using a many-to-one indexing process.

As shown in FIGS. 12-14, systems and methods are provided to reduce the command history datastore 117 version of a database or list 1000 of sequentially ordered prior read commands to a history pattern matching data structure of potentially smaller size and faster pattern matching capabilities. Referring to FIG. 12, instead of a datastore that is a database or list of a continuous time-ordered history of command information such as shown in FIG. 10A, a smaller history pattern match data structure may be stored and maintained in command history datastore 117. The history pattern match data structure may be a history pattern matching (HPM) table 1200 of fixed memory length of M table entries, where each table entry 1202 is identified by a unique index number 1204 (1-M) and includes a memory element (sometimes referred to herein as a memory location) 1206 for holding a predicted next host entry. The unique index number 1204 represents a many-to-one conversion of the full search sequence of recent read commands, for example a many-to-one mapping of the 8 entry search sequence described with respect to FIGS. 5-6. The predicted next host entry in a memory element 1206 may be a host identifier for a host that last followed the search sequence corresponding to index number 1204. In addition, in some implementations the command type or other data relating to the command may also be included with the host identifier. In such embodiments where command type is tracked in the datastore 117, the search sequence (pattern of prior commands) may also include several command type identifier bits to identify the command types being searched for among the multiple types of commands in the datastore. This command type identifier may be included in addition to the host identifier information so that a match of both host identifier and command type may be searched for. The search sequence, used with either the list 1000 or HPM table 1200 versions, may then include the type of the prior commands.

Referring to FIGS. 11-12, the format of a memory element 1206 in a table entry 1202 may be the same as the command history entry 1002 used for the linear list 1000 in FIGS. 10A-10B. Specifically, each next command entry stored in a memory element 1206 may have only the host identifier of a command that was previously received after the search sequence that led to the index value 1204 for that table entry. Additionally, the memory element 1206 may optionally include command type and/or fields for any other parameter related to the command. One example of another parameter related to the command that maybe stored in the memory element as part of a next command entry is a time difference between when the command identified in the memory element 1206 and the last command received prior to that command.

In order to use the history pattern matching data structure, also referred to herein as a prior read command data structure, such as the history pattern matching (HPM) table 1200 of FIG. 12, the host origin prediction module 112 of the controller 102 uses a many-to-one conversion technique on the search sequence generated in the search sequence buffer 121 after each command is received. Any of a number of many-to-one mapping functions adapted to take a large number of potential combinations and map them to a smaller fixed number of entries and having an order 1 (also referred to as O(1)) access-time complexity may be used. As used herein, the term O(1) refers to an algorithm that will always execute in the same time (or space) regardless of the size of the input data set.

In one implementation, a hash function combined with a modulo operation may be used by the controller 102 as the O(1) complexity operation. The hash function and modulo operation provide a O(1) complexity calculation that can reduce all of the possible different search sequence combinations of search sequence length L (where L equals the number of commands in the search sequence) and map them to a smaller, predetermined range of index numbers 1204. It should be noted that the search sequence refers to a pattern of commands, where the pattern of commands may be described as a specific sequence of host origins of commands over a period of time, hence the terms pattern and sequence may be used interchangeably herein. The hash and modulus (also referred to as modulo) functions may be selected such that the index numbers 1204 generated as an output of these functions is limited to the fixed size (memory length M) HPM table 1200 of FIG. 12. Thus, the modulus operation may be X MOD M, where X is the output of the hashed search sequence and M is the number of table entries supported. The modulus function would take the hash output, divide that output by M (memory length of HPM table in RAM) and return an integer remainder that would fall in the range of 0 to M-1, for a total of M possible index values. By limiting the potential index values to a predetermined range, the many-to-one algorithm provides a way of assigning each search sequence only one index value, but where each index value may apply to more than one different search sequence. A simplified example of the next host prediction steps using a many-to-one mapping and the resulting HPM table 1200 is shown in FIG. 13.

Referring to FIG. 13, one embodiment of a process 1300 of predicting a next host from which a command will be received using a many-to-one mapping of search sequences is shown. A command is received and the host origin of that command determined (at 1302, 1304). The host origin may be determined from a host identifier supplied by the specific host with the command, and the command may be any of a number of command types, such as read, write or erase command types. The new host identification is used to generate a new search sequence (at 1306) of predetermined pattern length (L) by inserting the new host identifier into the prior search sequence and removing the oldest command host identifier from the prior sequence. In this embodiment, L is shown as 8 total commands. The search sequence (at 1306) may be stored in the search sequence buffer 121 as described previously.

The controller 102 then passes the search sequence through a many-to-one mapping operation (at 1308) that may include a hash function (at 1310), followed by a modulo operation (at 1312) to make sure the hash value stays within the predetermined index value range supported by the HPM data structure 1200. The controller 102 may utilize any of a number of hash functions 1310, for example Bernstein's hash function djb2, Kernighan and Ritchie's hash function, New DataBase Manager (NDBM), Simple DataBase Manager (SDBM), Secure Hash Algorithm-1 (SHA-1) (Merkle-Damgard construction), Zobrist hashing (variable exclusive OR (XOR)) and so on. The controller may treat the search sequence as a string or as a number according to the Hash algorithm used. As one simplified example, where the search sequence is a time ordered sequence of 8 host identifiers for the current read command and the 7 last commands prior, and the host identifiers were numbers were 5, 3, 3, 1, 1, 2, 4, and 3, the string used as input for the hash function may be the concatenation of the host identifiers: 53311243. This example assumes that there are at least 5 different hosts, but any number of two or more hosts (or virtual hosts) may be used and any length search sequence may be used.

The many-to-one mapping routine 1308 may be executed by the controller 102 via the host origin prediction module 112. Once the index value is determined from the hash process, the index value is used to identify the entry in the HPM table 1200, as described previously, and the next host origin prediction is selected from the identified index entry in the table 1200 (at 1314). In one implementation, when the HPM table includes multiple memory elements 1206 in a table entry 1202, the most recent of the memory elements 1206 in the table entry 1202 identified by the index value is selected as the predicted next read.

As illustrated in FIG. 14, a method of updating a command history datastore 117 is illustrated for an HPM table 1200 version of predicting read commands. For an update of the command history datastore 117 on the storage device 100, when the command history is tracked in a sequential list 1000 of all prior commands, the update may be as simple as adding in the current command information (host identifier and optionally other command parameters) as another entry to that list. In one implementation, the list 1000 is simply adjusted in a "shift left" operation through to the oldest of the command history entries 1002 and the host identifier for the newest command added to the right side of the list 1000 (assuming, without loss of generality, that the newest is on the right side). The concept of shifting older entries toward one end of the list and adding in a new entry on the opposite end may apply to any direction the list may be oriented. In that way, the arrival order of the commands at the controller is tracked according to its entry location in the list.

Unlike the sequential list 1000 of read commands, the HPM table 1200 updates need to include the intermediate step of mapping the currently received command to an indexed search sequence of read prior commands. Thus, as illustrated in FIG. 14, when the new command is received, the last generated search sequence may be used to regenerate the index value of where the current command information is to be added to the HPM table 1200. Alternatively, if the index value for the last search sequence (used to predict the host origin of a next command that has now actually been received) is still stored in the controller memory, that index value may be used by the controller 102 to store the actual command information in a memory element 1206 of the table entry 1202 having that index value 1204.

As is evident from the prediction and update procedures for using a many-to-one mapping of prior command information, where a data structure such as a HPM table 1200 is used, in one embodiment a preferred order of activity is to first update the HPM table 1200 and then proceed with the prediction of the next host. This allows potential reuse of the last calculated index value for the pattern of prior host identifiers used to predict the current host command origin, or use of the search sequence still residing in the search sequence buffer 121 for those prior commands. Momentarily delaying generating the search sequence update, and new HPM table index calculation from the newly generated search sequence, until after the HPM table 1200 is updated with the received command permits the prior index calculation or prior search sequence to be used. Otherwise, a separate buffer may be necessary for the last search sequence and/or last index calculation.

In other implementations, the HPM table 1200 update may not occur prior to the prediction and instead only take place when the storage device is otherwise idle (e.g., at times when no host command is pending), so that there is no delay in executing the next host prediction process. In this alternative embodiment, command information for several commands may be accumulated, and then the HPM table 1200 may be updated at a later time, such as an idle period when the storage device has some idle time where there are no pending host commands.

As illustrated in FIG. 14, an update process 1400 is shown for embodiments using the HPM table 1200. For each command that arrives (at 1402) at the storage device 100, the HPM table 1200 is updated prior to the host prediction operation. The host origin for the most recent command is identified (at 1404) and is used to update the HPM table 1200. The last search sequence received and converted via the many-to-one conversion process, such as hashing and performing a modulo operation, may be used to locate the correct index location that the host identification information for the current command is to be written to.

Any number of techniques for retrieving or generating the prior indexed search sequence for use in updating the HPM table may be utilized. For example, the hashed index value for the prior search sequence may be retained in short term memory at the controller 102 and used to store the current command host identification information in the indexed past search sequence location. Accordingly, if the last HPM index value is still available in controller memory or elsewhere in the storage device (at 1406), it is retrieved (at 1408). The controller 102 then uses the retrieved last HPM index value 1204 to select the correct table entry 1202 in the HPM table 1200 and to store the host identification for the current command in a memory element 1206 for that indexed table entry 1202 (at 1410). Alternatively, when the last HPM index value is not available (at 1406), the controller may regenerate the last HPM index value from the prior search sequence (at 1412). The search sequence from the last host origin prediction operation may be retrieved from the search sequence buffer 121 before updating it with the host identification information of the current command (as will occur when the host origin prediction process of FIG. 13 moves forward, and the index value recalculated with the same many-to-one mapping procedure 1308 of hashing function and then applying a modulus operation as discussed with respect to FIG. 13. Using the search sequence from the last prediction that is still stored in the search sequence buffer 121 and recalculating the index number, the host identification information for the current command may be stored in the correct table entry 1202 with the recalculated last HPM index value for the prior search sequence (at 1410).

In one implementation, where there are unused memory elements available in the table entry 1202 of HPM table 1200 for that index value 1204, the host identification information for the current command is simply stored in the open memory element 1206, regardless of whether or not it is the same as other host identification information stored in a different memory element 1206 at that index value 1204. In other implementations, with more than one memory element per table entry, a host identification information may only be written once and any repeat of writing that same host identification information will trigger a counter or tag being added, or a histogram value generated, that tracks the number of times the value occurred. In this manner, other memory elements 1206 in the table entry 1202 may be freed up rather than writing the same value to multiple memory elements of that table entry. Also, when using the most frequently occurring value as the selected next read prediction, the controller can simply look at the counter rather than counting occurrences each time.

When more than one memory element 1206 is associated with each table entry 1202 and all of the memory elements are full, a "shift left" type of insertion and deletion of next read command entry data from the data elements may be used when new read command data is to be written to that table entry 1202. For example the last (oldest) value of read command data may be shifted out on the left side, the newer values previously written to the table entry are shifted to the left by one memory element, and the new value inserted at the right most memory element of that table entry 1202. The specific "shift left" discussion above is simply one example of a time-order update. Any of a number of arrangements are contemplated where a time-order is being kept (such that the "oldest" command could be dropped in order to make room for the newer command, or in order to prioritize the newer command) when producing the predicted next read command. In another implementation, where only a single memory element 1206 is included for each table entry 1202 in the HPM table 1200, a new command host origin value will overwrite the old value. In yet other implementations, when all of the one or more available memory locations for the particular index value have been written to previously, the new value may be discarded and the memory element kept fixed with the prior stored host identification information such that no updating of the HPM table 1200 after an initial host identification value has been written to a memory element.

As is to be expected when a many-to-one mapping technique is used on a large set of variations of data combinations (here a large number of potential combinations of search sequences converted to a smaller set of available index locations), there will be times when the different search sequences yield the same hashed index value. For example, if the potential number of search sequence combinations was 1000 and the hash algorithm is configured to only output numbers from 1 to 100, there could be, on average, 10 different combinations mapped to the same HPM table entry (assuming a perfect distribution of mappings among index values). To allow for different next host origin results for the same index value in the HPM table, the number of memory elements in the HPM table may be more than one so that different results may be recorded in the HPM table at different memory elements in the same table entry 1202.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled to form a NAND string within a single horizontal (e.g., x-z) memory device levels. Alternatively, the memory elements may be coupled to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for predicting a next host origin of a command in a multi-queue virtualized environment where the prediction may be used by the storage device to select a set of host memory configuration parameters associated with the predicted host to configure the storage device prior to receiving the next command. Multiple solutions for predictive model are contemplated. The systems and methods disclosed may allow pre-configuring of the storage device to handle the host specific configurations of a next command expected from the host, and thus may contribute to overall improvement of input/output operations per second (IOPS) and average operation latency, for a non-volatile memory system.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A storage device comprising:
   a non-volatile memory;
   a volatile memory; and
   a controller in communication with the non-volatile memory and the volatile memory, the controller configured to:
     receive a command from a first host of a plurality of hosts in communication with the storage device;
     prior to receiving a next command, predict a next host of the plurality of hosts from which the next command will arrive at the storage device based on the received command; and
     configure the storage device with host memory configuration parameters for the predicted next host prior to receiving the next command.

2. The storage device of claim 1, wherein the plurality of hosts comprises a plurality of virtual hosts.

3. The storage device of claim 1, wherein the plurality of hosts comprises a plurality of separate physical host devices.

4. The storage device of claim 1, wherein:
   the volatile memory comprises a data structure containing prior host command order data; and
   the controller is configured to predict the next host from which a command will arrive by comparing a pattern of recent host commands with the prior host command order data.

5. The storage device of claim 4, wherein the prior host command order data comprises only host identification information.

6. The storage device of claim 4, wherein the prior host command order data comprises host identification data and command type data.

7. The storage device of claim 1, wherein the controller is configured to predict the next host using a neural network stored in the storage device.

8. The storage device of claim 1, wherein the non-volatile memory comprises a substrate formed with a three-dimensional memory structure.

9. The storage device of claim 1, wherein:
   the non-volatile memory comprises a plurality of sets of host memory configuration parameters; and
   each set of the plurality of sets is associated with a different one of the plurality of hosts.

10. The storage device of claim 9, wherein the host memory configuration parameters in each set of the plurality of sets comprise:
    command submission queue priority;
    command submission queue weighting; and
    command submission queue arbitration method.

11. The storage device of claim 10, wherein the host memory configuration parameters further comprise:
    a last stopped arbitration point for the command submission queue arbitration method associated with a host.

12. The storage device of claim 1, wherein the controller is configured to configure the storage device with host memory configuration parameters during an idle period after execution of a current command.

13. A method for configuring a storage device, the method comprising:
    receiving commands from a plurality of hosts in communication with the storage device; and
    for a most recently received command:
      identifying a host of the plurality of hosts associated with the most recently received command;

determining, prior to receiving a next command, a predicted next host of the plurality of hosts from which a next command will arrive at the storage device based on the most recently received command; and updating the storage device with host memory configuration parameters for the predicted next host.

14. The method of claim 13, wherein:

the storage device comprises volatile memory storing a data structure containing prior host command order data; and determining the predicted next host comprises comparing a pattern of recent host commands with the prior host command order data in the data structure.

15. The method of claim 13, wherein determining the predicted next host comprises applying a pattern of recent host commands, including the most recently received command, to a neural network stored in the storage device.

16. The method of claim 14, further comprising updating the data structure containing prior host command order data with host identification information for the most recently received command.

17. The method of claim 13, wherein the host memory configuration parameters are selected from a plurality of sets of host memory configuration parameters, wherein each set of the plurality of sets of host memory configuration parameters is associated with a different one of the plurality of hosts.

18. The method of claim 17, wherein the host memory configuration parameters in each set of the plurality of sets of host memory configuration parameters comprises:

command submission queue priority;

command submission queue weighting; and command submission queue arbitration method.

19. The method of claim 18, wherein:

the host memory configuration parameters further comprise a last stopped arbitration point for the command submission queue arbitration method associated with a host; and the method further comprises saving the last stopped arbitration point for the command submission queue arbitration method associated with a host associated with the most recently received command before updating the storage device with the host memory configuration parameters for the predicted next host.

20. A storage device comprising:

a volatile memory comprising a plurality of sets of host memory configuration parameters, each set associated with a respective one of a plurality of hosts in communication with the storage device;

means for, in response to receiving a command from a first host of the plurality of hosts, predicting a next host of the plurality of hosts from which a next command will arrive based on the received host command; and means for configuring the storage device with a set of host memory configuration parameters from the plurality of sets of host memory configuration parameters for the predicted next host prior to receiving the next command.

\* \* \* \* \*